United States Patent
Yamamoto

[19]

[11] Patent Number: 5,852,554
[45] Date of Patent: Dec. 22, 1998

[54] POWER INVERTER HAVING THREE OR MORE PARALLEL DRIVEN PWM-TYPE POWER INVERTING UNITS

[75] Inventor: Yasuhiro Yamamoto, Aichi, Japan

[73] Assignee: Kabushiki Kaisha Meidensha, Tokyo, Japan

[21] Appl. No.: 873,923

[22] Filed: Jun. 12, 1997

[30] Foreign Application Priority Data

Jun. 12, 1996 [JP] Japan .................................. 8-150529

[51] Int. Cl.⁶ .................................................. H02M 7/519
[52] U.S. Cl. .............................................. 363/71; 363/65
[58] Field of Search .............................. 363/34, 36, 37, 363/65, 71, 95, 97, 131

[56] References Cited

U.S. PATENT DOCUMENTS

| | | | |
|---|---|---|---|
| 5,245,525 | 9/1993 | Galloway et al. | 363/71 |
| 5,253,155 | 10/1993 | Yamamoto | 363/71 |
| 5,657,217 | 8/1997 | Watanabe et al. | 363/71 |
| 5,705,909 | 1/1998 | Rajashekara | 363/71 |

FOREIGN PATENT DOCUMENTS 5-30661  2/1993  Japan .

*Primary Examiner*—Matthew V. Nguyen
*Attorney, Agent, or Firm*—Foley & Lardner

[57] ABSTRACT

A power inverter having: three or more PWM-type power inverting units which are so arranged and constructed as to be enabled to be driven in parallel; a plurality of integrated interphase reactors, each of which is so arranged and constructed as to synthesize each of the same phase output currents of the respective PWM-type inverting units and supply the synthesized phase output current to a load such as a three-phase induction motor; a plurality of current balance controllers, each of which is so arranged and constructed as to carry out a retardation correction for a PMW waveform outputted from the respective PWM-type power inverting units in the corresponding phase so that each phase current between the respective PWM-type inverting units is balanced.

11 Claims, 11 Drawing Sheets

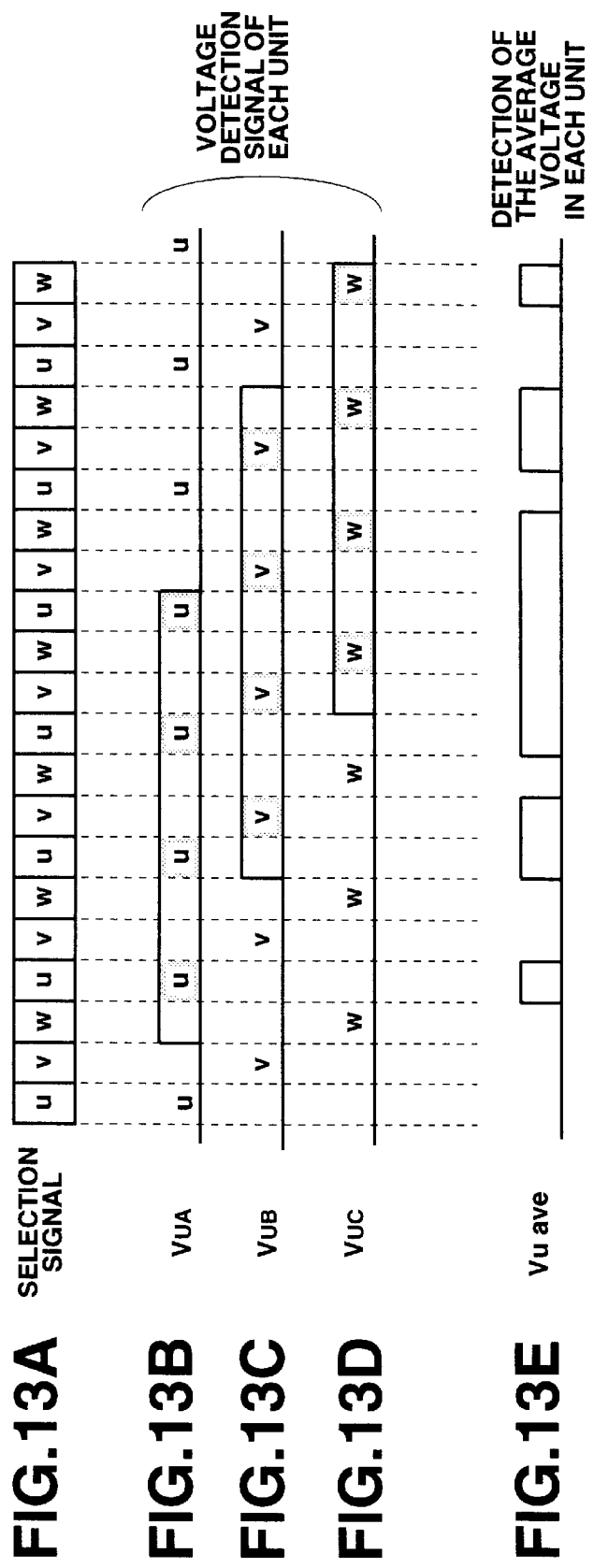

POWER INVERTER HAVING THREE OR MORE PARALLEL DRIVEN PWM-TYPE POWER INVERTING UNITS

BACKGROUND OF THE INVENTION

The present invention relates to a power inverter having three or more parallel driven PWM-type power inverting units so as to extend an output capacity thereof. The present invention, more particularly, relates to the power inverter which controls its output voltage according to a switching control method of a, so-called, PWM (Pulse Width Modulation) method using power switching devices such as bipolar transistors or IGBTs (Insulated Gate Bipolar Transistors) in which an output current balance between the respective PWM- type inverting units and in which an output current balance between output currents from the respective PWM-type inverting units is taken.

A power inverter serves to invert a DC voltage into a corresponding AC voltage by turning on and off the DC voltage using the switching devices in a time division manner.

In order to increase a capacity of the power inverter, there is a method of increasing capacities of the power switching devices themselves. However, this method has a limitation due to the capacities of the switching devices themselves.

A U.S. Pat. No. 5,253,155 issued on Oct. 12, 1993 (which corresponds to a Japanese Patent Application First Publication No. Heisei 5-30661 published on Feb. 5, 1993 and corresponds to a European Patent No. EP 0 524 398 B1 published on Aug. 21, 1996) exemplifies another method of extending the capacity of the power inverter in which two PWM-type inverting units are parallel driven.

However, an industry has demanded to supply the (three-phase) power inverter having three or more parallel driven PWM-type inverting units in order to achieve the further extension of the capacity that the power inverter is required to have.

SUMMARY OF THE INVENTION

It is an object of the present invention to provide a power inverter which can drive in parallel three or more PWM-type inverting units with each phase current balanced and which can compensate for dead times and switching times related to the parallel driven inverting units.

According to one aspect of the present invention, there is provided with a power inverter comprising:

three or more PWM-type power inverting units which are so arranged and constructed as to be enabled to be driven in parallel;

a plurality of integrated interphase reactors , each of which is so arranged and constructed as to synthesize each of the same phase output currents of the respective PWM-type inverting units and supply the synthesized phase output current to a load; and a plurality of current balance controllers, each of which is so arranged and constructed as to carry out a retardation correction for a PMW waveform outputted from the respective PWM-type power inverting units in the corresponding phase so that each phase current between the respective PWM- type inverting units is balanced, and wherein each of the integrated interphase reactors includes: a magnetic core member having a plurality of juxtaposed leg portions and a plurality of coils, each coil being wound so as to interlink to a corresponding one of the leg portions of the core member, each of same instantaneous polarity indicating terminals of the coils being connected to a corresponding phase output end of each PWM-type inverting unit so that the respective coils operatively generate magnetic fluxes on the juxtaposed leg portions in mutually the same directions in response to output phase currents of the respective PWM- type power inverting units and each of the other terminals thereof being connected together to the load.

According to another aspect of the present invention, there is provided with a power inverter comprising:

three or more PWM-type power inverting units which are so arranged and constructed as to be enabled to be driven in parallel;

a plurality of integrated interphase reactors , each of which is so arranged and constructed as to synthesize each of the same phase output currents of the respective PWM-type inverting units and supply the synthesized phase output current to a load; and a plurality of current balance controllers, each of which is so arranged and constructed as to carry out a retardation correction for a PMW waveform outputted from the respective PWM-type power inverting units in the corresponding phase so that each phase current between the respective PWM-type inverting units is balanced, and wherein each of the integrated interphase reactors includes: a magnetic core member having a plurality of juxtaposed leg portions and a plurality of coils, each coil being wound so as to interlink to a corresponding one of the leg portions of the core member, each of same instantaneous polarity indicating terminals of the coils being connected to a corresponding phase output end of each PWM-type inverting unit so that the respective coils operatively generate magnetic fluxes on the juxtaposed leg portions in mutually the same directions in response to output phase currents of the respective PWM-type power inverting units and each of the other terminals thereof being connected together to the load.

BRIEF DESCRIPTION OF THE DRAWINGS

FIGS. 13A, 13B, 13C, 13D, and 13E are integrally a timing chart for explaining an operation of the voltage detection and averaging circuit shown in FIG. 12.

BEST MODE FOR CARRYING OUT THE INVENTION

Reference will hereinafter be made to the drawings in order to facilitate a better understanding of the present invention.

Figure 1:
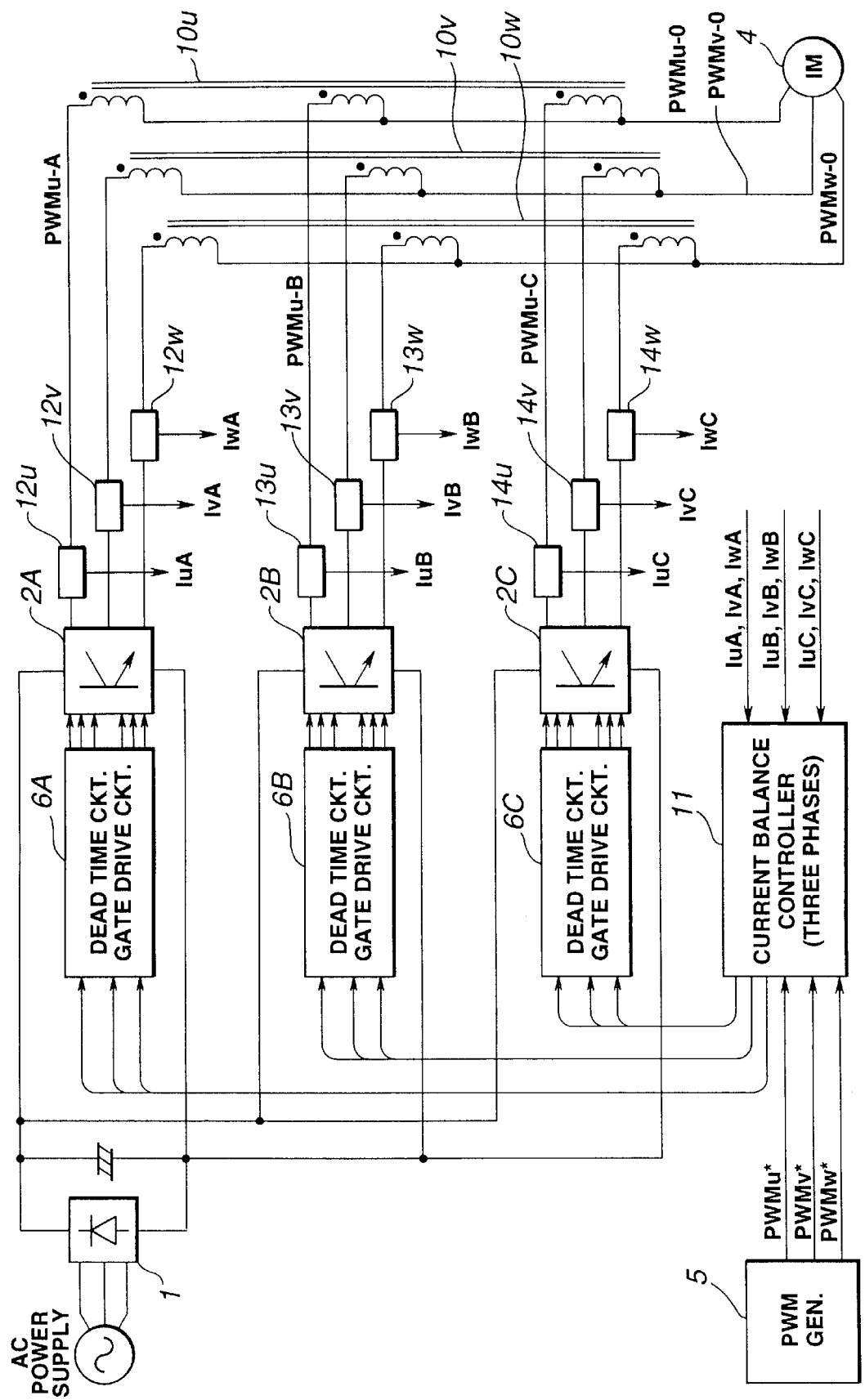
FIG. 1 is a circuit block diagram of a power inverter in a first preferred embodiment according to the present invention in which three power inverting units are driven in parallel.

FIG. 1 shows a circuit block diagram of a power inverter in a first preferred embodiment according to the present invention.

As shown in FIG. 1, the power inverter includes three PWM-type power inverting units parallel driven. The present invention is applicable to the power inverter in which four or more PWM-type power inverting units can be driven in parallel.

Large differences from the power inverter disclosed in the U.S. Pat. No. 5,253,155 issued on Oct. 12, 1993 will be described below:

(A) In place of a single interphase reactor of an intermediate tap type, a plurality of integrated interphase reactors are so arranged as to enable a parallel connection of three power inverting units. Each integrated interphase reactor is manufactured of a single iron core having multiple juxtaposed legs or of a plurality of iron cores.

(B) A current balance controlling method between each power inverting unit is extended to a circuit which is possible in the current balance in a state wherein the three power inverting units are connected in parallel. This circuit can be achieved by only modifying a part of current unbalance detection portions. Hence, a provision of a current balance feedback circuitry at the subsequent stage of PWM calculation disclosed in the above-identified United States Patent is effective in the power inverter according to the present invention.

Next, the detailed description of the first embodiment will be made.

A PWM generator 5, in response to an inputted voltage instruction and a frequency instruction, generates and outputs a PWM (Pulse Width Modulation) pulse to each phase line thereof, a period and-width being dependent upon the voltage instruction and the frequency instruction.

A three-phase AC power supply is connected across a power converter 1 which corresponds to the AC power supply into a corresponding DC power supply. An electrostatic capacitor is connected across both terminals of the AC-DC converter and both bias terminals of three-phase three PWM-type power inverting units 2A, 2B, and 2C is connected in parallel to each other across the electrostatic capacitor.

Each PWM-type power inverting unit 2A, 2B, and 2C includes serially connected U-phase transistors, serially connected V-phase transistors, and serially connected W-phase transistors. Each junction of the serially connected transistors is connected as a phase output of each PMW-type power inverting unit 2A, 2B, and 2C via a corresponding one of the three interphase reactors 10u, 10v, and 10w to a load such as a three-phase induction motor 4. Each gate (or base) end of the totally eighteen (6×3) serially connected transistors in the respective PWM-type power inverting units 2A, 2B, and 2C is connected to a drive circuit having a dead time compensation circuit (dead time ckt.) 6A, 6B, and 6C. Each phase output end of each of the PWM-type power inverting units 2A, 2B, and 2C is connected to a corresponding one of current detectors (constituted by, for example, a current transformer) 12u, 12v, 12w, 13u, 13v, 13w, 14u, 14v, and 14w to detect each phase output current of each of the power inverting units 2A, 2B, and 2C.

Each of the phase output currents 1uA, 1vA, 1wA, 1uB, 1vB, 1wB, 1uC, 1vC, and 1wC of each of the three PWM-type power inverting units 2A, 2B, and 2C is inputted to a current balance controller 11.

Each input end of the integrated interphase reactors 10u, 10v, and 10w having the same instantaneous magnetic polarity indicating dot marks is connected to each corresponding phase output end of the respective PWM-type inverting units 2A, 2B, and 2C. Each output end of the integrated interphase reactors 10u, 10v, and 10w is interconnected to the load 4.

The three-phase current balance controller 11 fetches phase output currents of the respective PWM-type power inverting units IuA, IvA, IwA, IuB, IvB, IwB, IuC, IvC, and IwC thereinto, carries out a current balancing correction for the inputted PWM waveform from the PWM generator 5, and provides the current balance corrected PWM waveform for the respective gate drive circuits 6A, 6B, and 6C.

Figure 2:
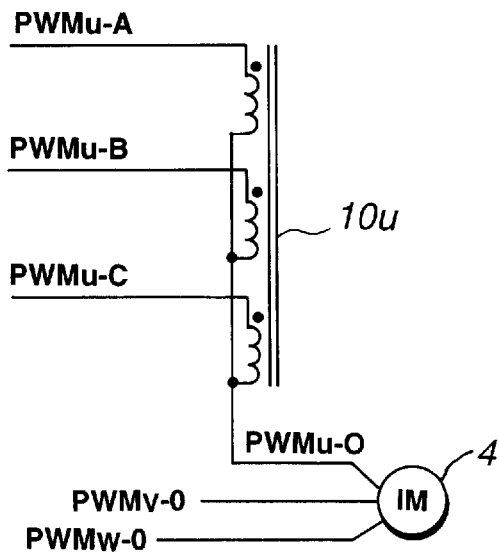
FIG. 2 is a wiring diagram of a U-phase (representative) integrated interphase reactor shown in FIG. 1.

Each of the integrated interphase reactors 10u, 10v, and 10w used to couple the corresponding phase outputs u, v, and w of the respective PWM-type power inverting units 2A, 2B, and 2C is typically shown in FIG. 2. FIG. 2 shows a first example of one of the integrated interphase reactors as the U-phase integrated interphase reactor 10u.

As shown in FIG. 2, each dot marked input end of each coil in the U-phase integrated interphase reactor 10u is connected to the corresponding U-phase output ends of PWMu-A, PWMv-B, and PWMw-C of the respective three PWM-type power inverting units 2A, 2B, and 2C.

The respective three coils of the U-phase integrated interphase reactor 10u are magnetically coupled with the iron core and are formed in a star connection whose neutral point serves as a synthesized output end.

The respective three coils of the respresentative U-phase integrated interphase reactor 10u are magnetically coupled with the iron core and are formed in a star connection whose neutral point serves as a synthesized output end.

A structure of each interphase reactor is constituted by a magnetic core member made of an iron and having a plurality of juxtaposed leg portions extended integrally from a connection leg portion and the plurality of coils each having the same number of windings and each wound around a corresponding one of the juxtaposed leg portions so as to interlink to the corresponding one of the juxtaposed leg portions. The number of the coils in each integrated interphase reactor is N (N denotes the number of the parallel driven PWM-type power inverting units).

Figure 3:
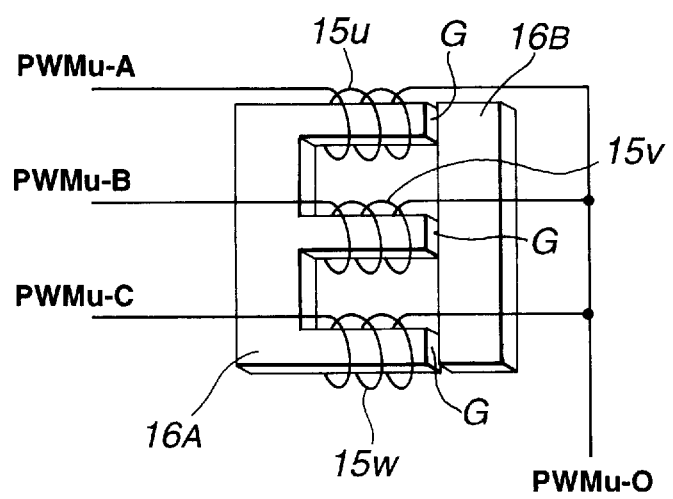
FIG. 3 is an explanatory view of a first example of a structure of the U-phase interphase reactor shown in FIG. 2.

FIG. 3 shows a first example of the representative integrated interphase reactor connected to the U-phase output end of the respective three (N=3) PWM-type power inverting units 2A, 2B, and 2C.

Each winding start end of the coils 15u, 15v, and 15w in the U-phase integrated interphase reactor 10u is connected to each U-phase output end PWMu-A, PWMu-B, and PWMu-C of the three power inverting units 2A, 2B, and 2C.

Each winding end of the respective coils 15u, 15v, and 15w in the U-phase integrated interphase reactor 10u is connected together to a corresponding one PWMu-O of the phase input ends of the induction motor 4. The iron core is of a three leg iron core type having a connection leg portion 16A and is provided with another iron core 16B with a gap G against each free end of the juxtaposed leg portions.

In FIG. 3, if each U-phase output current from the respective three power inverting units 2A, 2B, and 2C flows through the corresponding one of the three coils 15u, 15v, and 15w with the same balanced values, magnetomotive forces generated due to the current flows through the corresponding coils 15u, 15v, and 15w are mutually opposite to each other by 180° between the coils 15u, 15v, and 15w. Consequently, a magnetic flux is not generated in the U-phase integrated value thereof can be deemed to be zeroed. This applies equally well to the V-phase and W-phase integrated interphase reactors 10v and 10w.

It is noted, however, that, in FIG. 3, if the current value of any one of the respective U-phase output current from the corresponding one of the respective PWM-type power inverting units 2A, 2B, and 2C becomes different and unbalanced from any other U-phase output currents, a magnetic flux whose component corresponds to the difference in the current value is developed in the U-phase integrated interphase reactor 10u. The U-phase integrated interphase reactor 10u acts as an inductor having an inductance against this transverse magnetic flux component. The inductance of the inductor can suppress an increase in the unbalanced value of the current.

Hence, although the U.S. Pat. No. 5,353,155 discloses the two PWM-type power inverting units PWM-A and PWM-B parallel connected via the interphase reactor 11 of the intermediate tap type, the power inverter in the first embodiment includes the three PWM-type power inverting units 2A, 2B, and 2C parallel connected via the three integrated interphase reactors, one of which is shown in FIG. 3, in order to extend furthermore the capacity of the power inverter. Consequently, the above-described inductance effect can be achieved and can be applied to the power inverter having the two or more power inverting units.

Figure 4:
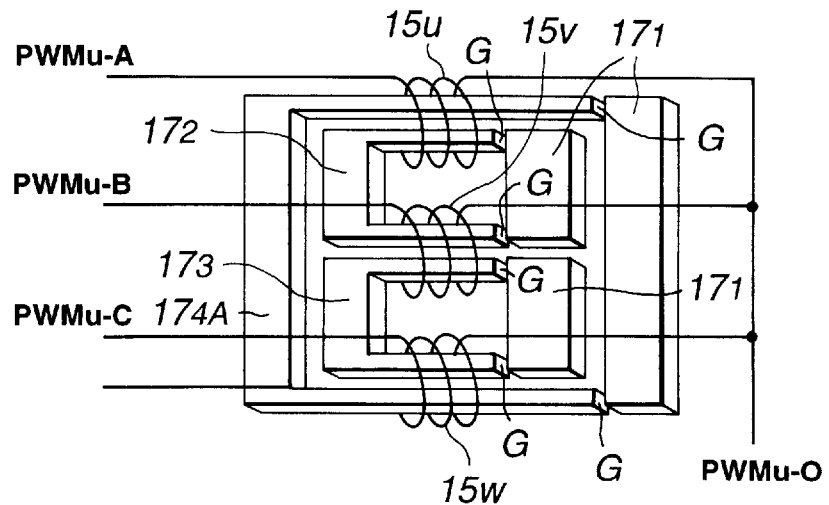
FIG. 4 is an explanatory view of a second example of the structure of the U-phase interphase reactor shown in FIG. 2.

Next, FIG. 4 shows a second example of the structure of the U-phase integrated interphase reactor 10u.

In FIG. 4, the magnetic core member includes three letter U-shaped iron cores (so-called, two-leg iron cores) $17_2$, $17_3$, and $17_{4A}$, small-sized two of the letter U-shaped iron cores $17_2$ and $17_3$ being juxtaposed to each other and the remaining letter U-shaped iron core $17_{4A}$ being arranged so as to enclose the small-sized juxtaposed two U-shaped iron cores $17_2$ and $17_3$.

One of the three coils 15u, 15v, and 15w which is for the U-phase output end PWMU-A of a first of the three power inverting units 2A is wound on the juxtaposed leg portions of the remaining letter U-shaped iron core $17_{4A}$ and one of the two letter U-shaped iron cores $17_2$.

One of the three coils 15u, 15v, and 15w which is for the U-phase output end PWMU-B of a second of the three power inverting units 2B is wound on the juxtaposed leg portions of the two small-sized letter U-shaped iron cores $17_2$ and $17_3$.

The remaining one of the three coils 15u, 15v, and 15w which is for the U-phase output end PWMu-C of a third of the three power inverting units 2C is wound on the remaining juxtaposed leg portion of the remaining large-sized U-shaped iron core and the remaining juxtaposed leg portion of the small-sized U-shaped iron core $17_3$.

Three other iron cores $17_1$ are faced against free ends of the respective three letter U-shaped iron cores 172, 173, and 174 with the same distances of the gaps.

Figure 8:
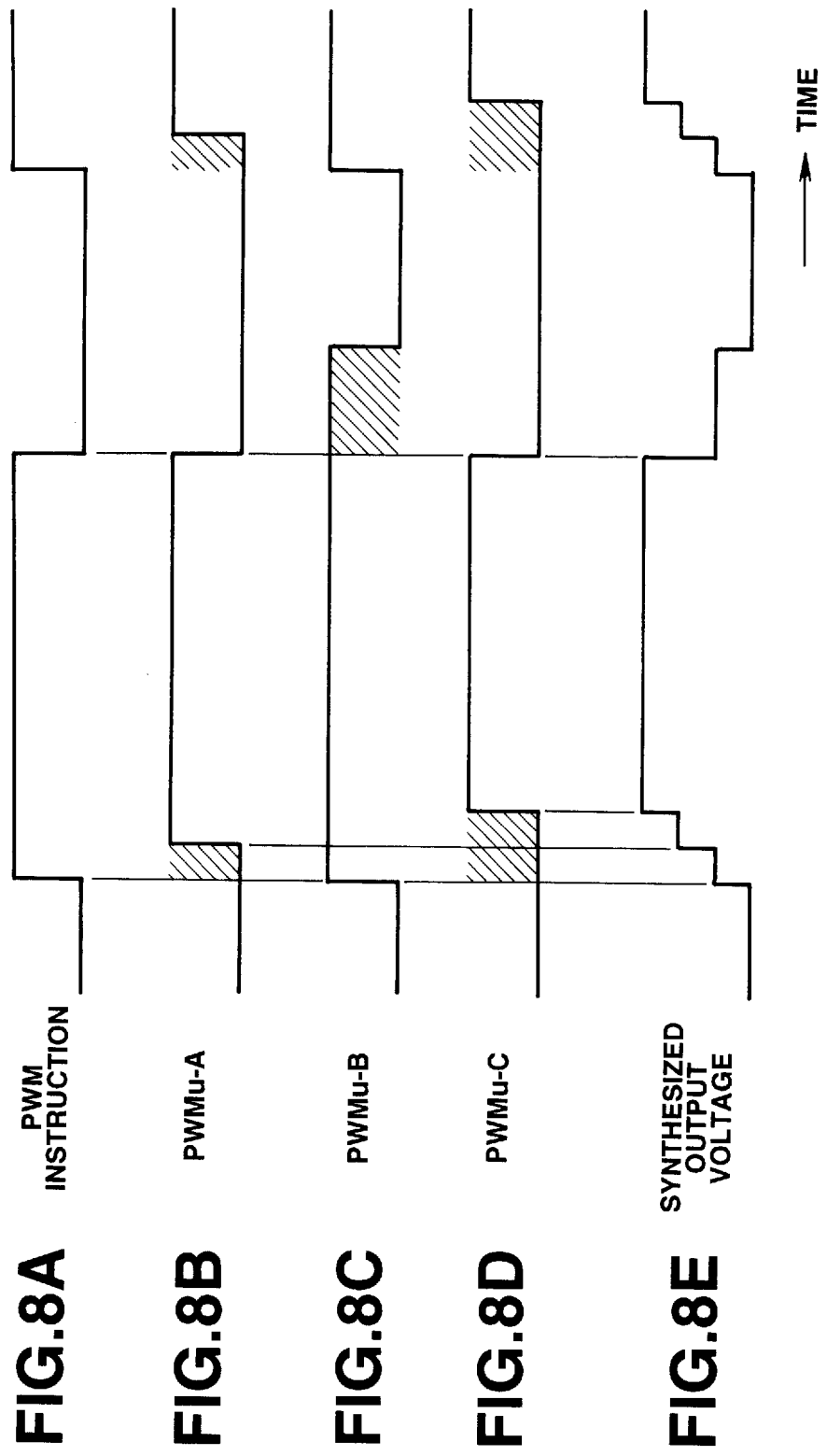
FIGS. 8A, 8B, 8C, 8D, and 8E are integrally a timing chart for explaining an operation of the current balance controller shown in FIG. 7.

The connections of the winding ends of the respective coils 15u, 15v, and 15w are the same as those shown in FIG. 8. The same structure as shown in FIG. 4 applies equally well to the V-phase and W-phase integrated interphase reactors 10v and 10w.

Figure 5:
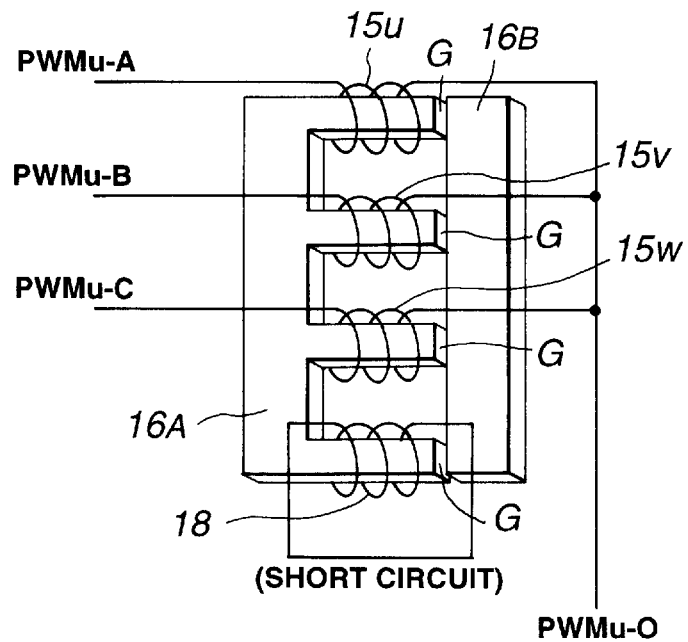
FIG. 5 is an explanatory view of a second example of the structure of the U-phase interphase reactor shown in FIG. 2.

FIG. 5 shows a third example of the structure of the U-phase integrated interphase reactor 10u.

In FIG. 5, the number of the juxtaposed leg portions of the integrated iron core 16A is increased by one as compared with FIG. 3 (N+1). A short-circuited coil 18 is wound in the same direction as each of the three coils 15u, 15v, and 15w on the newly added leg portion of the iron core 16A. The other iron core 16B is faced against a free end of the newly added leg portion of the iron core 16A. The short-circuited coil 18 acts to suppress the variation in the interlinkage magnetic fluxes around the three coils 15u, 15v, and 15w and operates in response to a transient variation in the magnetic fluxes as if an extra leg on which the short-circuit coil 18 is wound were not present.The same structure as shown in FIG. 5 applies equally well to the other V-phase and W-phase integrated interphase reactors 10v and 10w.

Figure 6:
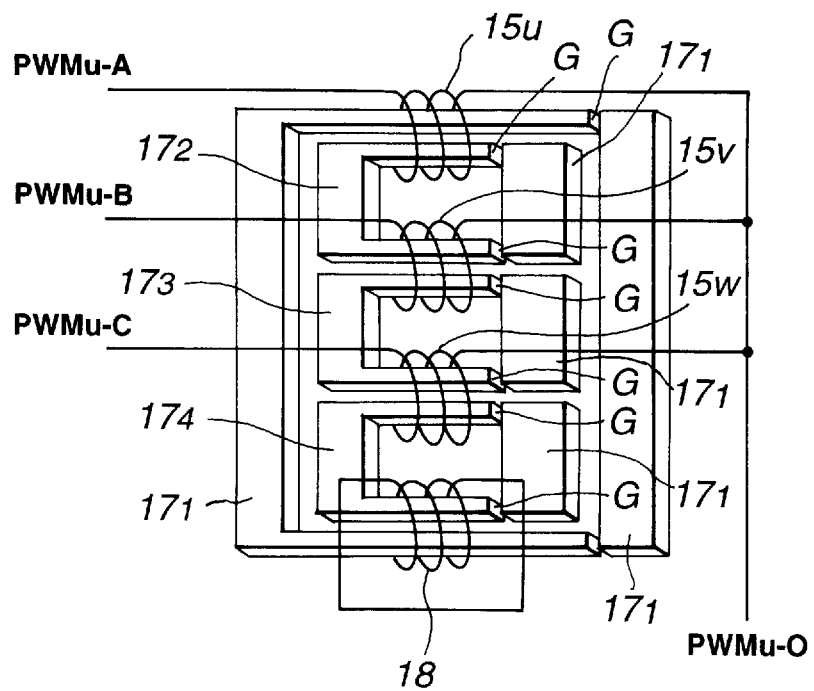
FIG. 6 is an explanatory view of a third example of the structure of the U-phase interphase reactor shown in FIG. 2.

FIG. 6 shows a fourth example of the structure of the U-phase integrated interphase reactor 10u.

As shown in FIG. 6, the short-circuited coil 18 is wound on the remaining juxtaposed leg portions of one $17_3$ of the small-sized U-shaped iron core $17_1$. The small-sized U-shaped iron cores are three $17_2$, $17_3$, and $17_4$ in the case of FIG. 6.

The other structure is generally the same as that shown in FIG. 4.

Figure 7:
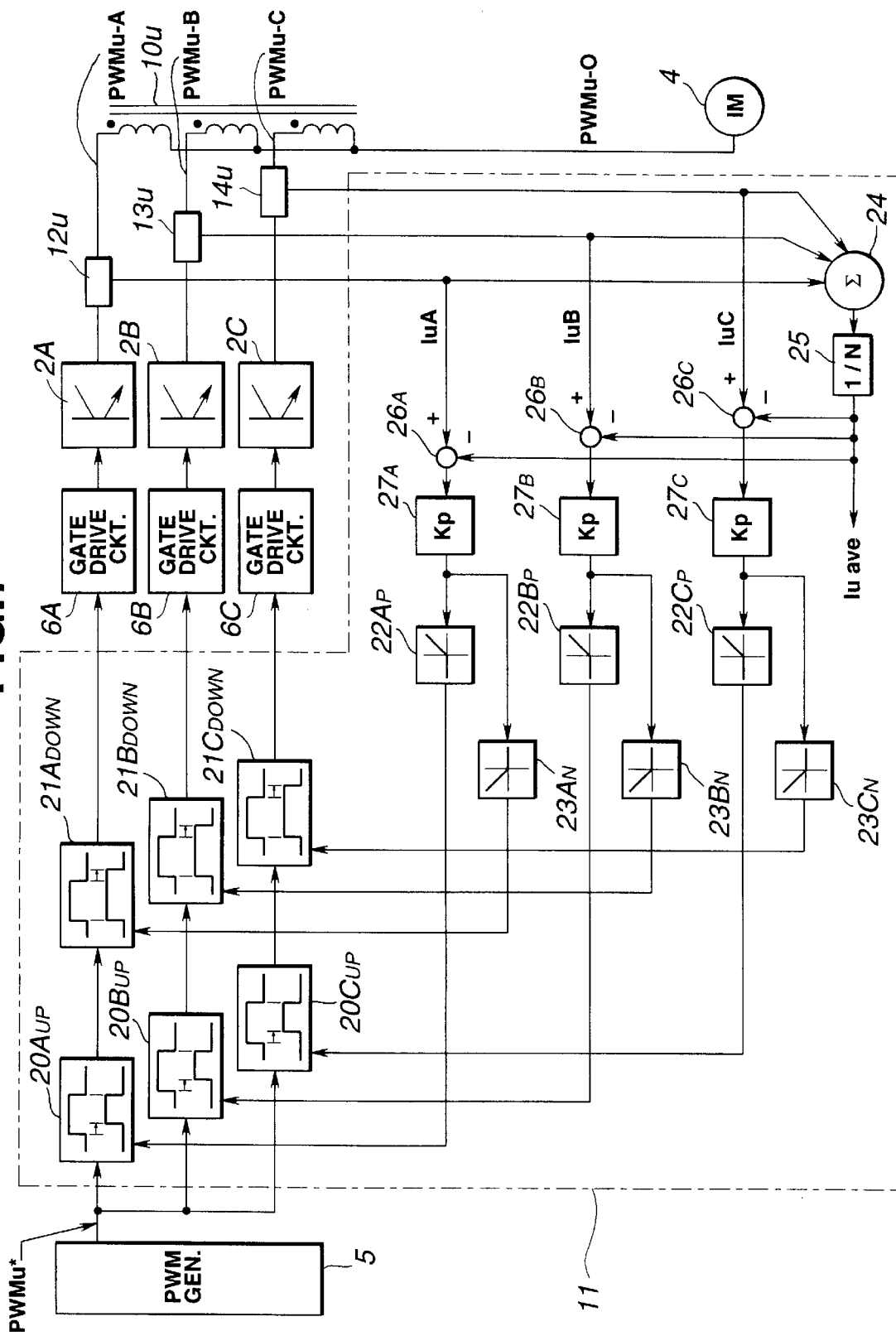
FIG. 7 is a circuit block diagram of a current balance controller shown in FIG. 1.

Next, FIG. 7 shows the detailed circuit block diagram of the current balance controller 11 in the first embodiment shown in FIG. 1, particularly describing the U-phase current balance controller.

As shown in FIG. 1, the above-described three integrated interphase reactors 10u, 10v, and 10w are utilized to constitute the parallel connected three PWM-type power inverting units 2A, 2B, and 2C.

Although each integrated interphase reactor 10u, 10v, and 10w can suppress the variation in the transverse currents generated due to the variations in the magnetic fluxes generated due to the difference in magnitudes of the corresponding phase output currents, each integrated interphase reactor 10u, 10v, and 10w cannot suppress those in DC components.

Hence, it is necessary to carry out the detection of each phase output current from each of the parallel driven power inverting units and carry out the current balance control between each power inverting unit in a case where current deviations in the DC components occur.

It is noted that FIG. 7 shows the U-phase related power inverting units 2A, 2B, and 2C and the U-phase related current balance controller 11.

The following three differences are present in the current balance controller 11 from the current balance controller disclosed in the U.S. Pat. No. 5,253,155.

(1) The current detectors 12u, 12v, and 12w (13u, 13v, and 13w and 14u, 14v, and 14w) are disposed for each of the three power inverting units 2A, 2B, and 2C.

(2) In order to detect an unbalance of each phase output current, a total of the corresponding phase output currents from the three PWM-type inverting units 2A, 2B, and 2C is calculated by a summer 24 and the calculated total current is multiplied by 1/N (N=3) to derive an average phase current Iuave (Ivave and Iwave). Each phase output current $I_{AU}$ ($I_{AV}$ and $I_{AW}$) is detected by the corresponding phase output current detector 12u, 12v, and 12w (13u, 13v, and 13w and 14u, 14v, and 14w). A result of subtraction of the average phase output current Iuave (Ivave and Iwave) from each of the detected corresponding phase output currents $I_{AU}$ ($I_{BU}$ and $I_{CU}$) is deemed as an error (unbalanced) current.

(3) The error current is multiplied by a correction gain kp and each gain multiplied output error current is supplied to a correction circuitry of a switching delay time.

As shown in FIG. 7, a rise time of each PWM pulse PWMu* derived from the PWM generator 5 is delayed by means of each rise time corrector 20Aup, 20Bup, and 20Cup for the corresponding one of the power inverting units 2A, 2B, and 2C. A fall time of each PWM pulse PWMU* derived from the PWM generator 5 is delayed by means of each fall time corrector 21Adown, 21Bdown, and 21Cdown.

Then, the U-phase output currents of the respective power inverting units 2A, 2B, and 2C are corrected by means of these rise time and fall time correctors described above.

Each delay time set by the corresponding one of the rise time correctors 20Aup, 20Bup, and 20Cup is controlled by a corresponding one of respective positive polarity amplifiers 22Ap, 22Bp, and 22Cp.

On the other hand, each delay time set by the corresponding one of the respective fall time correctors 21Adown, 21Bdown, and 21Cdown is controlled by a corresponding one of respective negative polarity amplifiers 23AN, 23BN, and 23CN.

Input signals of these amplifiers 22Ap, 22Bp, 22Cp, 23BN, 2and 23CN are derived according to the deviation between each one of the detected U-phase output currents IAU, IBU, and ICU and the average U-phase current Iuave and the polarity of the deviation (namely, whether the result of the subtraction indicates positive or negative).

The average current Iuave is derived by the summer 24 and by a divider as follows: Iuave=(IAU+IBU+ICU)/N (N =3).

Each deviation calculator 26A, 26B, and 26C serves to derive a deviation between each U-phase output current IAU, IBU, and ICU and the average U-phase current Iuave and its polarity (plus or minus). Each deviation control amplifier 27A, 27B, and 27C calculates a proportional-integration (P-I) using a proportional coefficient (correction gain) Kp from the corresponding one of the deviation calculators 26A, 26B, and 26C. The result of the P-I calculation of each deviation control amplifier 27A, 27B, and 27C is inputted into the corresponding two of the respective polarity amplifiers 22Ap, 22Bp, 22Cp and 23AN, 23BN, and 23CN.

When the output calculation signal of one of the deviation calculators 26A, 26B, and 26C is positive, the corresponding PWM pulse PWMu* in the corresponding one of the rise time correctors 20Aup, 20Bup, and 20Cup is delayed according to the deviation via the corresponding one of the positive polarity amplifiers 22Ap, 22Bp, and 22Cp.

When the output calculation signal of one of the deviation calculators 26A, 26B, and 26C is negative, the corresponding PWM pulse PWMu* in the corresponding one of the fall time correctors 21Adown, 21Bdown, and 21Cdown is delayed according to the deviation via the corresponding one of the negative polarity amplifiers 23AN, 23BN, and 23CN.

FIGS. 8A, 8B, 8C, 8D, and 8E integrally show a signal timing chart of each signal at parts of the power inverter shown in FIGS. 1 and 7. The PWM instruction shown in FIG. 8A corresponds to PWMu* shown in FIG. 7. The PWMu-A, PWMu-B, and PWMu-C shown in FIGS. 8B, 8C, and 8D corresponds to those respective U-phase output signals from the respective power inverting units 2A, 2B, and 2C shown in FIGS. 1 and 7. The synthesized output voltage shown in FIG. 8E corresponds to PWMu-O shown in FIG. 7.

Portions in FIG. 8B denoted by oblique lines (hatched portions) corresponds to time domains in which the current balance controller 11 carries out the current balance controller 11 carries out the current balance corrections for the PWMu-A pulse, for the PWMu-B pulse, and for the PWMu-C pulse, respectively.

That is to say, each leading edge of the PWMu-A and PWMu-C pulse for the first and third power inverting units 2A and 2C is delayed and each trailing edge of the PWMu-B pulse for the second power inverting unit 2B is delayed.

These corrective controls can achieve the current balance by retarding the rise time or the fall time of each PWM waveform of the same phases which is unbalanced in the output currents in the same phases of the respective three power inverting units 2A, 2B, and 2C.

In the current balance control method in FIG. 7, the rise time and/or the fall time of any one, any two, or all of the output PWMU, PWMV, and PWMW pulses of the respective three power inverting units 2A, 2B, and 2C is delayed during and according to the development in the corresponding current unbalanced state. Hence, a switching delay timing of the output voltage derived from each of the power inverting units and synthesized by each corresponding integrated interphase reactor is 10u, 10v, and 10w is varied according to a current unbalanced quantity.

Figure 9:
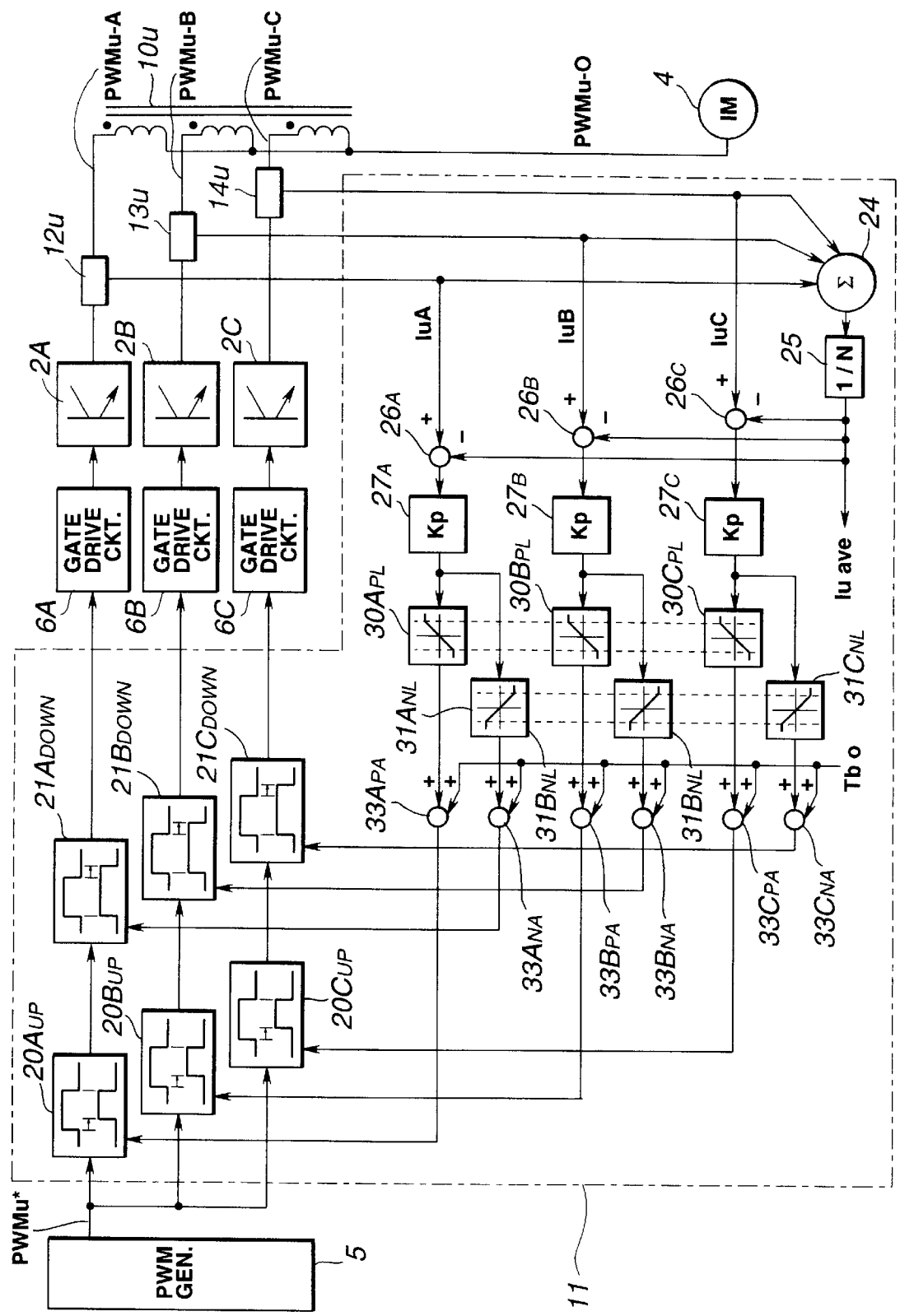
FIG. 9 is a circuit block diagram of the current balance controller in a second preferred embodiment of the power inverter according to the present invention.
Figure 10:
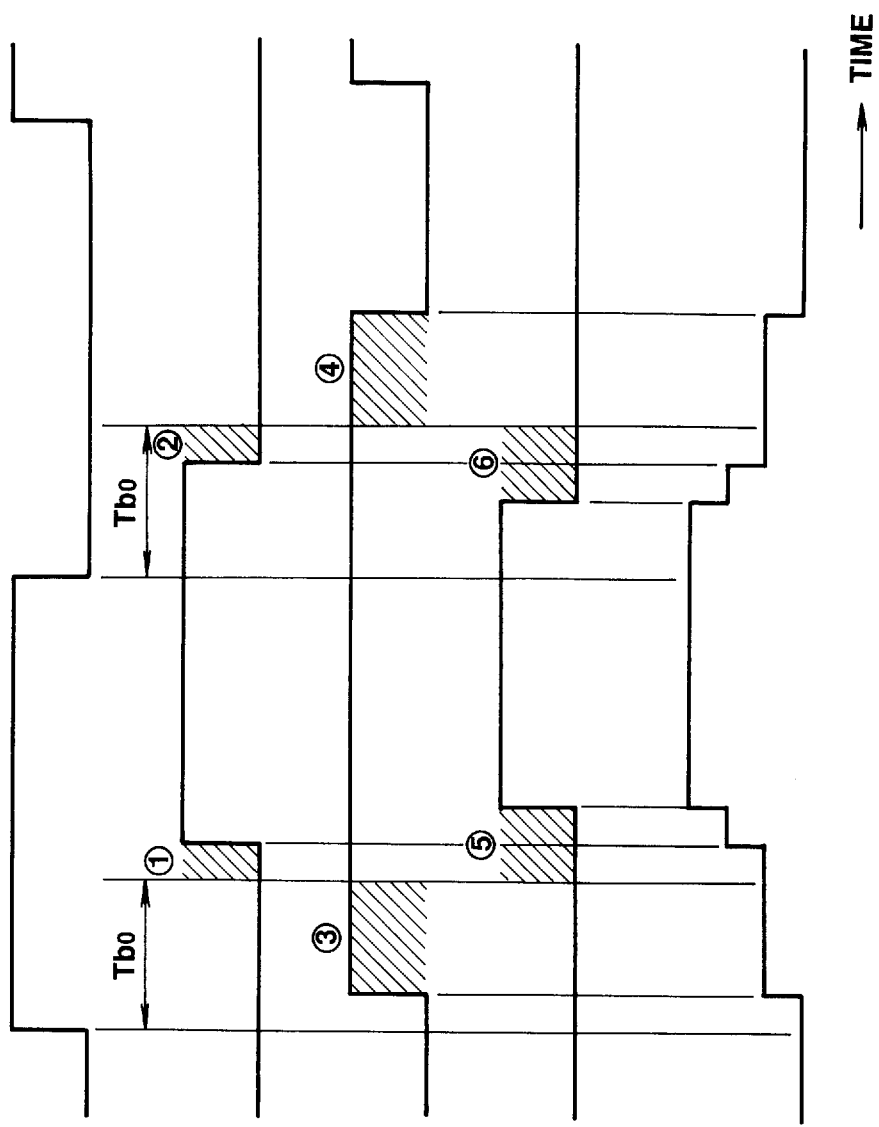
FIGS. 10A, 10B, 10C, 10D, and 10E are integrally a timing chart for explaining an operation of the current balance controller shown in FIG. 9.

FIG. 9 shows a second preferred embodiment of the power inverter in which the current balance controller 11 is designed to suppress the variation of the above-described switching delay timing.

In FIG. 9, as compared with the current balance controller 11 in the case of FIG. 7, in order for the switching delay time in the synthesized phase voltage developed due to the current balance control to be constant irrespective of the current balance quantity, a constant delay time duration Tbo is added to each set delay time in each corresponding one of the rise time and fall time correctors 20Aup, 20Bup, 20Cup, 21Adown, 21Bdown, and 21Cdown and the positive and negative values of the respective delay times derived according to the deviation between each pulse current output of the corresponding one of the power inverting units 2A, 2B, and 2C and its average current value are added to the constant delay time deviation Tbo.

The above-described function of the current balance controller 11 corresponds to limiters 30ApL, 30BpL, and 30CpL, 31ANL, 31BNL, and 31CNL and adders 32ApA, 32BpA, 32CpA, and 33ANA, 33BNA, and 33CAN as shown in FIG. 9.

Each limiter 30ApL, 30BpL, and 30CpL has a positive limit value and a negative limit value, above of both limit values of which the delay control signal from the corresponding one of the deviation control amplifiers $27_A$, $27_B$ and $27_C$ is limited to provide a corresponding limited delay control signal. The limited delay control signal passed through the corresponding one of the limiters 30ApL, 30BpL, and 30CpL is added to an offset signal corresponding to the constant delay time duration Tbo by means of the corresponding one of the adders 33ApA, 33BpA, and 33CpA to provide the delay control signal. Consequently, the delay correction signal is supplied to the corresponding one of the rise time correctors 20Aup, 20Bup, and 20Cup.

Each limiter 31ANL, 31BNL, and 31CNL has negative limit value and the positive limit value as reversed from each limiter 30ApL, 30BpL, and 30CpL, above of both limit values of which the delay control signal from the corresponding one of the deviation control amplifiers 27A, 27B, and 27C is limited to provide the corresponding delay control signal having the polarity opposite to the corresponding delay control signal derived from the corresponding one of the limiters 30ApL, 30BpL, and 30CpL. The delay control signal derived from the corresponding one of the limiters 27A, 27B, and 27C is added to the offset signal corresponding to the constant time duration Tbo by means of the corresponding one of the adders 33ANA, 33BNA, and 33CAN to provide the delay correction signal. The delay correction signal derived from the corresponding one of the adders 33ANA, 33BNA, and 33CAN is supplied to the corresponding one of the fall time correctors 21Adown, 21Bdown, and 21Cdown.

FIGS. 10A, 10B, 10C, 10D, and 10E integrally show the signal timing chart in the power inverter in the case of the second embodiment shown in FIG. 9.

Each of the oblique lines shown in FIG. 10B, FIG. 10C, and FIG. 10D denotes the time domain in which the delay time set in the corresponding one of the rise time and fall time correctors 20Aup to 21Cdown from which or to which the constant delay time duration Tbo is subtracted or added.

In the case of FIGS. 10A through 10E, each leading edge of the corresponding PWM waveforms PWMU-A and PWMU-B of the first and third power inverting units 2A and 2C are delayed with the control time duration Tbo added and each trailing edge of the corresponding PWM waveforms PWMu-A and PWMu-C of the first and third power inverting units 2A and 2C is delayed with the constant time duration Tbo added in the opposite direction. Furthermore, the trailing edge of the PWM pulse waveform PWMu-B of the second power inverting unit 2B is delayed by the time corresponding to the offset signal of the constant time duration Tbo and the leading edge thereof is delayed by the delayed time substracted from the offset signal of the constant delay time duration Tbo.

As appreciated from FIGS. 10A through 10E, since the current error component is detected also in the second embodiment shown in FIG. 9, a total sum of the set delay time of the three power inverting units 2A, 2B, and 2C can become zero (①=②, ③=④, and ⑤=⑥), an average delay time over the three PWM pulses PWMu-A, PWMu-B, and PWMu-C can indicate a constant ((Tbo+①+Tbo-③+Tbo+⑤) )/3=((Tbo-②+Tbo +④+Tbo-⑥))/3=constant).

In the first or second embodiment shown in FIG. 7 or FIG. 9, the dead time compensation circuit provided in each of the gate drive circuits 6A, 6B, and 6C serves to derive a dead time compensated PWM waveform output by comparing the PWM waveform output by comparing the PWM waveform delayed by means of the current balance controller 11 shown in FIG. 7 or FIG. 9 as a reference with a corresponding output voltage phase of the respective three power inverting units 2A, 2B, and 2C. It is noted that variations in switching times of the respective switching devices (power transistors) in the respective power inverting units 2A, 2B, and 2C can be compensated for by the dead time compensation circuits provided in the respective gate circuits 6A, 6B, and 6C.

It is also noted that a basic theory of the dead time compensation is described in the U.S. Pat. No. 5,253,155 (, the disclosure of which is herein incorporated by reference).

Figure 11:
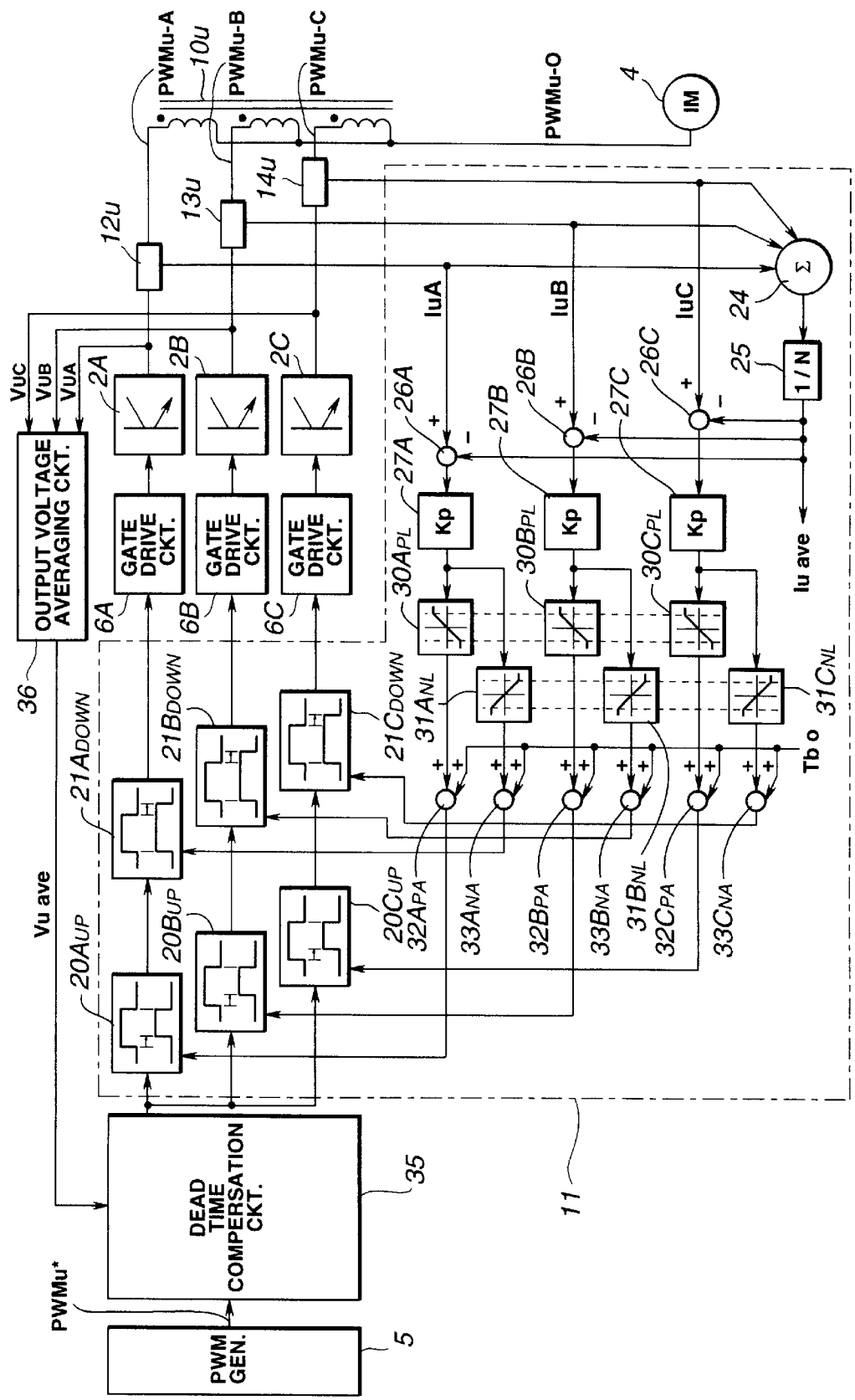
FIG. 11 is a circuit block diagram of the current balance controller in a third preferred embodiment according to the present invention.

FIG. 11 shows a third preferred embodiment of the power inverter in which a detection of voltage used to compensate for the dead time and for the switching time variation described above is achieved with the current balance controller 11 used for the N (N≧3) parallel driven power inverting units.

In FIG. 11, the individual dead time compensation circuits provided in the respective gate drive circuits 6A, 6B, and 6C are moved as a single (U-phase purpose) dead time compensation circuit 35 installed at a preceding stage to the current balance controller 11 and a compensation value of the dead time compensation circuit 35 is derived from an output voltage averaging circuit 36.

Figure 12:
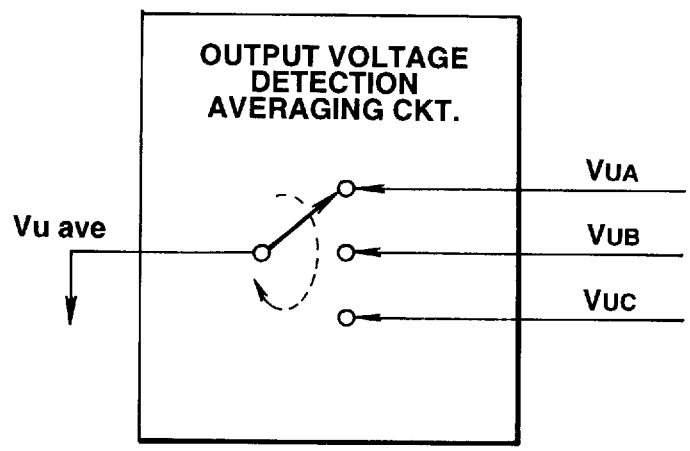
FIG. 12 is a functional block diagram of a voltage detection and averaging circuit used in each embodiment of the current balance controller.

The output voltage averaging curcuit 36 sequentially fetches each of the output voltage VuA, VuB, and VuC of the respective U-phase sided power inverting units 2A, 2B, and 2C thereinto for each period of a basic clock installed in the current balance controller 11 in a time division manner and derives an average value Vuave of these fetched output voltages VuA, VuB, and VuC, as typically shown in FIG. 12.

FIGS. 13A, 13B, 13C, and 13D integrally show an operation timing chart of the output voltage averaging circuit 36.

FIG. 13A shows a selection signal based on the basic clock.

As shown in FIGS. 13A through 13E, the time division processing permits the derivation of the averaged output voltage equivalent to the average output voltage of each power inverting unit 2A, 2B, and 2C even if the output voltage waveforms of the respective power inverting units 2A, 2B, and 2C are different from each other.

It is noted that although FIGS. 7 through 13 show only the U-phase related circuitry, the same circuit structure is applied to the V-phase and W-phase related circuitry.

That is to say, PWMu* is changed to PWMv* and PWMW*, IUA to IVA and IWA, IUB to IVB and IWB, IUC to IVC and IWC, Iuave to Ivave and Iwave, PWMu-A to PWMv-A and PWMw-A, PWMu-B to PWMV-B and PWMv-C, PWMu-C to PWMv-C and PWMw-C, 12$u$ to 12$v$ and 12$w$, 13$u$ to 13$v$ and 13$w$, 14$u$ to 14$v$ and 14$w$, PWMu-0 to PWMv-0 and PWMw-0, and Vuave to Vvave and Vwave.

It is noted that the number of turns of the short-circuited coil 18 may be arbitrary but the winding direction of the short-circuited coil 18 is the same as that of each of the other coils.

What is claimed is:

1. A power inverter comprising:
three or more PWM-type power inverting units which are so arranged and constructed as to be enabled to be driven in parallel;
a plurality of integrated interphase reactors , each of which is so arranged and constructed as to synthesize each of the same phase output currents of the respective PWM-type inverting units and supply the synthesized phase output current to a load; and
a plurality of current balance controllers, each of which is so arranged and constructed as to carry out a retardation correction for a PMW waveform outputted from the respective PWM-type power inverting units in the corresponding phase so that each phase current between the respective PWM-type inverting units is balanced, and wherein each of the integrated interphase reactors includes: a magnetic core member having a plurality of juxtaposed leg portions and a plurality of coils, each coil being wound so as to interlink to a corresponding one of the leg portions of the core member, each of same instantaneous polarity indicating terminals of the coils being connected to a corresponding phase output end of each PWM-type inverting unit so that the respective coils operatively generate magnetic fluxes on the juxtaposed leg portions in mutually the same directions in response to output phase currents of the respective PWM-type power inverting units and each of the other terminals thereof being connected together to the load.

2. A power inverter as claimed in claim 1, wherein said magnetic core member of each integrated interphase reactor comprises an iron core and wherein the number of the juxtaposed leg portions of each integrated interphase reactor is the same number of the PWM-type parallel driven inverting units (N, N≧3).

3. A power inverter as claimed in claim 2, wherein said iron core of each integrated interphase reactor has a connection leg portion integrally connected to each juxtaposed leg portion and another magnetic core juxtaposed to the connection leg portion with a gap provided against a free end of each juxtaposed leg portion and wherein a winding direction of each coil on the corresponding one of the juxtaposed leg portions of each integrated interphase reactor is the same.

4. A power inverter as claimed in claim 2, wherein said iron core of each integrated interphase reactor has a plurality of connection leg portions, each connection leg portion being integrally connected to corresponding two of the juxtaposed leg portions, and a plurality of other iron cores, each of the other iron cores being juxtaposed to a corresponding one of the connection leg portions with a gap provided against a free end of each juxtaposed leg portion and wherein each coil is wound on the corresponding two of the juxtaposed leg portions.

5. A power inverter as claimed in claim 3, which further comprises a short-circuited coil in each of said integrated interphase reactors and another leg portion juxtaposed to the juxtaposed leg portions on which the short-circuited coil is wound so that a variation in interlinkage magnetic fluxes on the remaining coils other than the short-circuit coil is suppressed.

6. A power inverter as claimed in claim 4, which further comprises a short-circuited coil in each of said integrated interphase reactors and another leg portion juxtaposed to the juxtaposed leg portions on which the short-circuited coil is wound so that a variation in interlinkage magnetic fluxes on the remaining coils other than the short-circuit coil is suppressed.

7. A power inverter as claimed in claim 5, wherein the number of N is equal to three.

8. A power inverter as claimed in claim 1, wherein each current balance controller comprises: a plurality of current detectors, each current detector detecting a phase output current from the corresponding phase output end of the respective PWM-type power inverting units; a calculator arranged for deriving an average value of the detected phase output currents by the current detectors; a plurality of deviation determinators, each arranged for determining a deviation of the average value of the detected phase output currents from the corresponding one of the detected phase output currents; a plurality of time compensation quantity calculators, each of which is arranged for determining whether the determined deviation is positive or negative and for deriving a time compensation quantity corresponding to the deviation of the average value of the detected phase output currents from the corresponding one of the detected phase output currents according to the determination of whether the determined deviation is positive or negative; and a plurality of two-series connected waveform correctors, one of each of the two-series connected correctors thereof being arranged for delaying a rise time of a PWM waveform outputted at the corresponding phase output end of the corresponding one of the PWM-type power inverting units by the time compensation quantity when the determined deviation is positive and the other of each of the two-series connected correctors thereof being arranged for delaying a fall time of the same PWM waveform outputted at the same output phase end of the same of the PWM-type power inverting units when the determined deviation is negative.

9. A power inverter as claimed in claim 8, wherein each of the time compensation quantity calculators comprises limiters, each arranged for limiting the time compensation quantity within limit values corresponding to positive and negative constant delay time duration +,− Tbo and wherein each of the time compensation quantity calculators adds an offset signal corresponding to the positive and negative constant time durations +,− Tbo to an output signal of each of the limiters.

10. A power inverter as claimed in claim 9, which further comprises a plurality of voltage averaging circuits, each phase voltage averaging circuit selectively and sequentially sampling an output voltage of the same phase between each of the PWM-type power inverting units so as to derive an average value of the corresponding phase voltage and a plurality of dead time compensation circuits, each circuit carrying out a dead time compensation for the PWM waveform according to the derived average voltage value so that a dead time of the PWM waveform is compensated for according to the derived average voltage value.

11. A power inverter as claimed in claim 10, wherein the load comprises a three-phase induction motor.

* * * * *